United States Patent
Takahashi et al.

(10) Patent No.: US 10,196,510 B2
(45) Date of Patent: Feb. 5, 2019

(54) METHACRYLIC RESIN COMPOSITION AND MOLDED BODY THEREOF

(71) Applicant: KURARAY CO., LTD., Kurashiki-shi (JP)

(72) Inventors: Toru Takahashi, Tainai (JP); Atsuhiro Nakahara, Tainai (JP); Hiroshi Ozawa, Tainai (JP); Toru Abe, Tainai (JP); Yusaku Nomoto, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 369 days.

(21) Appl. No.: 14/891,559

(22) PCT Filed: May 16, 2014

(86) PCT No.: PCT/JP2014/063040
§ 371 (c)(1),
(2) Date: Nov. 16, 2015

(87) PCT Pub. No.: WO2014/185509
PCT Pub. Date: Nov. 20, 2014

(65) Prior Publication Data
US 2016/0090479 A1    Mar. 31, 2016

(30) Foreign Application Priority Data

May 16, 2013    (JP) .................................. 2013-104431
Jan. 23, 2014    (JP) .................................. 2014-010843

(51) Int. Cl.
| | | |
|---|---|---|
| *C08L 33/10* | (2006.01) | |
| *G02B 5/30* | (2006.01) | |
| *C08L 33/12* | (2006.01) | |
| *C08L 23/12* | (2006.01) | |

(52) U.S. Cl.
CPC .............. *C08L 33/10* (2013.01); *C08L 23/12* (2013.01); *C08L 33/12* (2013.01); *G02B 5/3083* (2013.01); *C08L 2201/10* (2013.01); *C08L 2203/16* (2013.01); *C08L 2205/025* (2013.01)

(58) Field of Classification Search
CPC ...................................................... C08L 33/10
See application file for complete search history.

(56) References Cited

U.S. PATENT DOCUMENTS

| | | | |
|---|---|---|---|
| 5,280,070 | A | 1/1994 | Drzewinski |
| 6,444,719 | B1 | 9/2002 | Mizumoto et al. |
| 8,829,099 | B2 * | 9/2014 | Kumazawa ........... C08F 285/00 523/200 |
| 2009/0030132 | A1 | 1/2009 | Kumazawa et al. |
| 2011/0098432 | A1 | 4/2011 | Marshall et al. |
| 2011/0269907 | A1 * | 11/2011 | Kumazawa ............. C08L 25/12 525/64 |

FOREIGN PATENT DOCUMENTS

| | | |
|---|---|---|
| EP | 0 402 219 A1 | 12/1990 |
| JP | 64-14216 A | 1/1989 |
| JP | 3-263412 A | 11/1991 |
| JP | 6-128475 A | 5/1994 |
| JP | 2000-109579 A | 4/2000 |
| JP | 2002-327012 A | 11/2002 |
| JP | 2007-39637 A | 2/2007 |
| WO | WO-2007007435 A1 * | 1/2007 ............ C08F 285/00 |

OTHER PUBLICATIONS

International Search Report dated Aug. 5, 2014 in PCT/JP14/063040 Filed May 16, 2014.
Supplementary European Search Report dated Dec. 13, 2016 in Patent Application No. 14 79 7542.

* cited by examiner

*Primary Examiner* — Michael F Pepitone
(74) *Attorney, Agent, or Firm* — Oblon, McClelland, Maier & Neustadt, L.L.P.

(57) ABSTRACT

A methacrylic resin [1] having a triad syndiotacticity (rr) of not less than 65% and a methacrylic resin [2] having a triad syndiotacticity (rr) of 45 to 58% are melt kneaded in a mass ratio of the methacrylic resin [1]/the methacrylic resin [2] of 40/60 to 70/30, and further melt kneaded preferably with a polycarbonate resin in a ratio of 1 to 10 parts by mass of the polycarbonate resin to the total 100 parts by mass of the methacrylic resin [1] and the methacrylic resin [2] to obtain a methacrylic resin composition.

10 Claims, No Drawings

METHACRYLIC RESIN COMPOSITION AND MOLDED BODY THEREOF

CROSS REFERENCE TO RELATED APPLICATIONS

This application is a national stage application of PCT/JP2014/063040, filed May 16, 2014, which claims priority to Japanese applications JP 2013-104431, filed May 16, 2013, and JP 2014-010843, filed Jan. 23, 2014.

TECHNICAL FIELD

The present invention relates to a methacrylic resin composition and a formed article thereof. The present invention relates to a formed article having a high transparency, a low thermal shrinkage ratio, a high strength and an excellent surface smoothness, and also relates to a methacrylic resin composition having an excellent formability from which the above formed article can be obtained.

BACKGROUND ART

A methacrylic resin, which has a high transparency, is useful as a material for a formed article used in an optical member, a illumination member, a signboard member, a decoration member and the like. However, a methacrylic resin has a glass transition temperature of as low as about 110° C., and thus a formed article comprising that methacrylic resin may have a problem of susceptibility to heat deformation.

It is known that a methacrylic resin may have a high glass transition temperature if it has a high syndiotacticity. Examples of a method for manufacturing a methacrylic resin having a high syndiotacticity can include a method involving anionic polymerization (see Patent Documents 1 and 2). However, since a methacrylic resin having a high syndiotacticity obtained by this method has an inferior formability, a formed article comprising this methacrylic resin tends to have an inferior surface smoothness. It is known that lowering a molecular weight can improve formability, but this may cause another problem that the resulting formed article has decreased mechanical strength. For this reason, a formed article comprising a methacrylic resin having a high syndiotacticity has not yet been available for practical use.

CITATION LIST

Patent Literatures

Patent Document 1: JP H3-263412 A
Patent Document 2: JP 2002-327012 A

SUMMARY OF THE INVENTION

Problems to be Resolved by the Invention

An objective of the present invention is to provide a formed article having a high transparency, a low thermal shrinkage ratio, a high strength and an excellent surface smoothness, and to provide a methacrylic resin composition having an excellent formability which is useful as a material for the aforementioned formed article.

Means for Solving the Problem

As a result of conducting extensive studies to achieve the above objective, the present inventors have completed the present invention which includes the following embodiments.

(1) A methacrylic resin composition comprising a methacrylic resin [1] having a triad syndiotacticity (rr) of not less than 65% and a methacrylic resin [2] having a triad syndiotacticity (rr) of 45 to 58% in a mass ratio of the methacrylic resin [1]/the methacrylic resin [2] of 40/60 to 70/30.
(2) The methacrylic resin composition according to (1), wherein the total content of a structural unit derived from methyl methacrylate is not less than 99 mass % relative to the total mass of the methacrylic resin [1] and the methacrylic resin [2].
(3) The methacrylic resin composition according to (1) or (2), wherein the methacrylic resin [1] is obtained by anionic polymerization.
(4) The methacrylic resin composition according to any one of (1) to (3), wherein the methacrylic resin [2] is obtained by radical polymerization at a polymerization temperature of 100 to 200° C.
(5) The methacrylic resin composition according to any one of (1) to (4), wherein the methacrylic resin [2] has a weight average molecular weight (hereinafter, the weight average molecular weight is referred to as "Mw.") of 50000 to 150000.
(6) The methacrylic resin composition according to any one of (1) to (5), wherein the molecular weight distribution (Mw/Mn) of the methacrylic resin [1] is 1.01 to 1.8, and the molecular weight distribution (Mw/Mn) of the methacrylic resin [2] is 1.7 to 2.6.
(7) The methacrylic resin composition according to any one of (1) to (6), further comprising an ultraviolet absorber.
(8) The methacrylic resin composition according to any one of (1) to (7), further comprising 1 to 10 parts by mass of a polycarbonate resin relative to the total 100 parts by mass of the methacrylic resin [1] and the methacrylic resin [2].
(9) A formed article comprising the methacrylic resin composition according to any one of (1) to (8).
(10) A film or sheet comprising the methacrylic resin composition according to any one of (1) to (8).
(11) A film or sheet for optical use comprising the methacrylic resin composition according to any one of (1) to (8).
(12) A phase difference film comprising the methacrylic resin composition according to any one of (1) to (8).
(13) A polarizer protective film comprising the methacrylic resin composition according to any one of (1) to (8).
(14) A method for manufacturing a methacrylic resin composition, the method comprising melt-kneading a methacrylic resin [1] having a triad syndiotacticity (rr) of not less than 65% and a methacrylic resin [2] having a triad syndiotacticity (rr) of 45 to 58%, in a mass ratio of the methacrylic resin [1]/the methacrylic resin [2] of 40/60 to 70/30.
(15) The method for manufacturing a methacrylic resin composition according to (14), further comprising melt-kneading a polycarbonate resin.

Advantageous Effects of the Invention

The methacrylic resin composition according to the present invention has an excellent formability, which can provide a formed article having a high transparency, a low thermal shrinkage ratio, a high strength and an excellent surface smoothness.

EMBODIMENTS FOR CARRYING OUT THE INVENTION

The methacrylic resin composition according to the present invention comprises a methacrylic resin [1] and a methacrylic resin [2].

The methacrylic resin [1] has a triad syndiotacticity (rr) of not less than 65%, preferably 70 to 90%, more preferably 72 to 85%. The glass transition temperature of the methacrylic resin composition according to the present invention can be increased in a case where the aforementioned syndiotacticity is not less than 65%. Further, a formed article having a high surface hardness can be obtained in a case where the syndiotacticity is not less than 65%.

As used herein, the triad syndiotacticity (rr) (hereinafter, may simply be referred to as "syndiotacticity (rr)") refers to a percentage where two diads which are linkage of consecutive two structural units in a triad which is linkages of consecutive three structural units are both in racemo (denoted as rr). Note that the diad which is the linkage of the two structural units in a polymer molecule having the same steric configuration are called meso, and otherwise called racemo, which are denoted as m and r, respectively.

The triad syndiotacticity (rr) (%) can be calculated by obtaining a $^1$H-NMR spectrum in deuterated chloroform at 30° C.; determining an area (X) of a region between 0.6 and 0.95 ppm and an area (Y) of a region between 0.6 and 1.35 ppm in that spectrum when TMS is taken as 0 ppm; and using them in the expression (X/Y)×100.

The amount of the methacrylic resin [1] comprised in the methacrylic resin composition according to the present invention is preferably 40 to 70 mass %, more preferably 45 to 65 mass %, even more preferably 50 to 60 mass % in view of that a high glass transition temperature and a good formability can be simultaneously achieved. The glass transition temperature of a methacrylic resin composition tends to be higher in the case of not less than 40 mass % while the formability of a methacrylic resin composition tends to be improved in the case of not more than 70 mass %.

The Mw of the methacrylic resin [1] is preferably 40000 to 150000, more preferably 40000 to 120000, even more preferably 50000 to 100000. In a case where the Mw is not less than 40000, a formed article obtained from a methacrylic resin composition tends to have an improved impact resistance and toughness, and in the case of not more than 150000, it tends to have an improved fluidity, which in turn improves formability.

The methacrylic resin [1] has the ratio (Mw/Mn, Hereafter, this value is denoted as a "molecular weight distribution.") of Mw to a number average molecular weight (hereafter, the number average molecular weight is denoted as "Mn.") of preferably from 1.01 to 1.8, more preferably from 1.05 to 1.5, even more preferably from 1.05 to 1.3. In a case where the methacrylic resin [1] having a molecular weight distribution in these ranges is used, a formed article having an excellent mechanical strength can easily be obtained. Mw and Mn can be controlled by adjusting the type and amount of a polymerization initiator used when manufacturing the methacrylic resin [1]. Note that Mw and Mn are values in terms of the molecular weight of a polystyrene standard converted from a chromatogram obtained by gel permeation chromatography (GPC) determination.

The glass transition temperature of the methacrylic resin [1] is preferably not less than 125° C., more preferably not less than 128° C., even more preferably not less than 130° C. The upper limit of the glass transition temperature of the methacrylic resin [1] is preferably 140° C. The glass transition temperature can be controlled by adjusting a molecular weight, syndiotacticity (rr) or the like. As the glass transition temperature of the methacrylic resin [1] increases, that of the resulting methacrylic resin composition increases. Therefore, a formed article comprising the methacrylic resin composition unlikely undergoes deformation such as thermal shrinkage or the like. Note that glass transition temperatures designated in the present invention are midpoint glass transition temperatures as measured by the method described in Example.

The methacrylic resin [1] has a content of a structural unit derived from a methacrylic acid ester of preferably not less than 90 mass %, more preferably not less than 95 mass %, even more preferably not less than 98 mass %, still more preferably not less than 99 mass %, most preferably 100 mass %. Examples of the methacrylic acid ester can include methacrylic acid alkyl esters such as methyl methacrylate, ethyl methacrylate, butyl methacrylate or the like; methacrylic acid aryl esters such as phenyl methacrylate or the like; methacrylic acid cycloalkyl esters such as cyclohexyl methacrylate, norbornenyl methacrylate or the like. Among these, methacrylic acid alkyl esters are preferred, and methyl methacrylate is most preferred.

For the methacrylic resin [1], the content of a structural unit derived from methyl methacrylate among the above structural units derived from the methacrylic acid esters is preferably not less than 90 mass %, more preferably not less than 95 mass %, even more preferably not less than 98 mass %, still more preferably not less than 99 mass %, most preferably 100 mass %.

Examples of structural units other than those derived from methacrylic acid esters which can be comprised in the methacrylic resin [1] can include, for example, structural units derived from vinyl monomers having only one polymerizable carbon-carbon double bond in one molecule such as acrylic acid alkyl esters such as methyl acrylate, ethyl acrylate, propyl acrylate, butyl acrylate, 2-ethylhexyl acrylate or the like; acrylic acid aryl esters such as phenyl acrylate or the like; acrylic acid cycloalkyl esters such as cyclohexyl acrylate, norbornenyl acrylate or the like; aromatic vinyl compounds such as styrene, α-methyl styrene or the like; acrylamide; methacrylamide; acrylonitrile; methacrylonitrile or the like.

There is no particular limitation for a method for manufacturing the methacrylic resin [1]. In view of higher productivity, higher thermal decomposition resistance, less foreign substances, less dimers and trimers of a methacrylic acid ester and the appearance of a formed article is excellent, preferred is a method for manufacturing the methacrylic resin [1] comprising the anionic polymerization with adjusting a polymerization temperature, a polymerization duration, the type and amount of a chain transfer agent, the type and amount of a polymerization initiator and the like.

As the anionic polymerization method, mentioned can be, for example, a method comprising performing anionic polymerization in the presence of a mineral acid salt such as a salt of alkali metal or alkali earth metal using an organoalkali metal compound as a polymerization initiator (see JP H07-25859 B), a method comprising performing anionic polymerization in the presence of an organoaluminum compound using an organoalkali metal compound as a polymerization initiator (see JP H11-335432 A), a method comprising performing anionic polymerization using an organo rare earth metal complex as a polymerization initiator (see JP H06-93060 A) and the like.

Alkyllithium such as n-butyllithium, sec-butyllithium, isobutyllithium, tert-butyllithium is preferably used as a polymerization initiator in the anionic polymerization method for manufacturing the methacrylic resin [1]. Further, an organoaluminum compound is preferably allowed to coexist in view of productivity.

Examples of an organoaluminum compound can include compounds represented by $AlR^1R^2R^3$ (wherein $R^1$, $R^2$ and R³ each independently represent an optionally substituted alkyl group, an optionally substituted cycloalkyl group, an optionally substituted aryl group, an optionally substituted aralkyl group, an optionally substituted alkoxyl group, an optionally substituted aryloxy group or N,N-disubstituted amino group. Further, R² and R³ may join together to form an optionally substituted arylenedioxy group.).

Specific examples of an organoaluminum compound can include isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum and the like.

Further, in the case of the anionic polymerization method, an ether, a nitrogen-containing compound and the like can also be allowed to coexist in order to control the polymerization reaction.

The methacrylic resin [2] has a triad syndiotacticity (rr) of 45 to 58%, preferably 49 to 55%. In a case where the syndiotacticity (rr) is not less than 45%, the glass transition temperature of the methacrylic resin composition according to the present invention tends to be increased. In a case where the syndiotacticity (rr) is not more than 58%, the formability of the methacrylic resin composition according to the present invention tends to be improved.

The amount of the methacrylic resin [2] comprised in the methacrylic resin composition according to the present invention is preferably 30 to 60 mass %, and in view of that the glass transition temperature and the formability are balanced, it is more preferably 35 to 55 mass %, even more preferably 40 to 50 mass %. In a case where it is less than 30 mass %, the formability of a methacrylic resin composition tends to be decreased, and in a case where it is more than 60 mass %, the glass transition temperature of a methacrylic resin composition tend to be decreased.

The Mw of the methacrylic resin [2] is preferably 40000 to 150000, more preferably 50000 to 120000, even more preferably 50000 to 100000. In a case where the Mw is not less than 40000, the impact resistance and toughness of a formed article obtained from a methacrylic resin composition tend to be improved. In a case where the Mw is not more than 150000, the fluidity of a methacrylic resin composition tends to be improved, which in turn enhances the formability.

The molecular weight distribution (Mw/Mn) of the methacrylic resin [2] is preferably 1.7 to 2.6, more preferably 1.7 to 2.3, even more preferably 1.7 to 2.0. Using of the methacrylic resin [2] having a molecular weight distribution within the above range can easily give a formed article having an excellent mechanical strength. Mw and Mn can be controlled by adjusting the type and amount of a polymerization initiator used when manufacturing the methacrylic resin [2].

The methacrylic resin [2] has a glass transition temperature of preferably not less than 100° C., more preferably not less than 110° C., even more preferably not less than 115° C., most preferably not less than 117° C. The upper limit of the glass transition temperature of the methacrylic resin [2] is preferably 120° C. The glass transition temperature can be controlled by adjusting the molecular weight and/or syndiotacticity (rr). In a case where the glass transition temperature of the methacrylic resin [2] is in the range, the thermal resistance of the methacrylic resin composition is increased. Therefore, a formed article which unlikely undergoes deformation such as thermal shrinkage or the like can easily be obtained.

The methacrylic resin [2] has a content of a structural unit derived from a methacrylic acid ester of preferably not less than 90 mass %, more preferably not less than 95 mass %, even more preferably not less than 98 mass %, still more preferably not less than 99 mass %, most preferably 100 mass %. Examples of the methacrylic acid ester can include methacrylic acid alkyl esters such as methyl methacrylate, ethyl methacrylate, butyl methacrylate or the like; methacrylic acid aryl esters such as phenyl methacrylate or the like; methacrylic acid cycloalkyl esters such as cyclohexyl methacrylate, norbornenyl methacrylate or the like. A methacrylic acid alkyl ester is preferred, and methyl methacrylate is most preferred.

For the methacrylic resin [2], the content of a structural unit derived from methyl methacrylate among the structural units derived from the above methacrylic acid esters is preferably not less than 90 mass %, more preferably not less than 95 mass %, even more preferably not less than 98 mass %, still more preferably not less than 99 mass %, most preferably 100 mass %.

Examples of structural units other than those derived from methacrylic acid esters which can be comprised in the methacrylic resin [2] can include structural units derived from vinyl monomers having only one polymerizable carbon-carbon double bond in one molecule such as acrylic acid alkyl esters such as methyl acrylate, ethyl acrylate, propyl acrylate, butyl acrylate, 2-ethylhexyl acrylate or the like; acrylic acid aryl esters such as phenyl acrylate or the like; acrylic acid cycloalkyl esters such as cyclohexyl acrylate, norbornenyl acrylate or the like; aromatic vinyl compounds such as styrene, α-methyl styrene or the like; acrylamide; methacrylamide; acrylonitrile; methacrylonitrile or the like.

There is no particular limitation for a method for manufacturing the methacrylic resin [2]. In view of productivity, preferred is a method for manufacturing the methacrylic resin [2] comprising the radical polymerization by adjusting a polymerization temperature, a polymerization duration, the type and amount of a chain transfer agent, the type and amount of a polymerization initiator and the like.

The above radical polymerization is preferably performed in the absence or presence of a solvent, and preferably performed in the absence of a solvent in view of that the methacrylic resin [2] having a low impurity concentration can be obtained. In order to reduce the development of silver streak and/or coloring in a formed article, a polymerization reaction is preferably performed with the level of dissolved oxygen maintained low. Further, a polymerization reaction is preferably performed under an atmosphere of inert gas such as nitrogen gas.

There is no particular limitation for a polymerization initiator used in the radical polymerization for manufacturing the methacrylic resin [2] as long as it generates a reactive radical. As the polymerization initiator, mentioned are, for example, t-hexylperoxyisopropyl monocarbonate, t-hexylperoxy 2-ethylhexanoate, 1,1,3,3-tetramethylbutylperoxy 2-ethylhexanoate, t-butylperoxy pivalate, t-hexylperoxy pivalate, t-butylperoxy neodecanoate, t-hexylperoxy neodecanoate, 1,1,3,3-tetramethylbutylperoxy neodecanoate, 1,1-bis(t-hexylperoxy)cyclohexane, benzoyl peroxide, 3,5,5-trimethylhexanoyl peroxide, lauroyl peroxide, 2,2'-azobis(2-methylpropionitrile), 2,2'-azobis(2-methylbutyronitrile), dimethyl 2,2'-azobis(2-methylpropionate) and the like. Among these, t-hexylperoxy 2-ethylhexanoate, 1,1-bis(t-hexylperoxy)cyclohexane, dimethyl 2,2'-azobis(2-methylpropionate) are preferred.

The 1-hour half-life temperature of the polymerization initiator is preferably 60 to 140° C., more preferably 80 to 120° C. Further, a polymerization initiator used for manufacture of the methacrylic resin [2] has a hydrogen abstraction ability of preferably not more than 20%, more preferably not more than 10%, even more preferably not more than 5%. The polymerization initiators can be used alone or in combination of two or more. The used amount of a polymerization initiator is preferably 0.0001 to 0.02 part by mass, more preferably 0.001 to 0.01 part by mass, even more preferably 0.005 to 0.007 part by mass relative to 100 parts by mass of a monomer subjected to a polymerization reaction.

Note that the hydrogen abstraction abilities can be available in technical documents from manufacturers of polymerization initiators (for example, a technical document from NOF Corporation, "The hydrogen abstraction abilities and initiator efficiency of organoperoxides" (created on April, 2003) and the like. Further, they can be measured by the radical trapping method in which α-methylstyrene dimers are used, i.e., the α-methylstyrene dimer trapping method. The above determination is usually performed as follows. First, a polymerization initiator is cleaved in the presence of α-methylstyrene dimers as a radical trapping agent to generate radical fragments. Among the radical fragments generated, a radical fragment with a low hydrogen abstraction ability binds to and is captured by a double bond of α-methylstyrene dimer. In contrast, a radical fragment with a high hydrogen abstraction ability abstracts a hydrogen from cyclohexane to generate a cyclohexyl radical, which binds to and is captured by a double bond of α-methylstyrene dimer. As used herein, the hydrogen abstraction ability is a ratio (molar ratio) of radical fragments with a high hydrogen abstraction ability to a theoretical yield of radical fragments as determined by quantifying cyclohexane or captured products of cyclohexane.

Examples of a chain transfer agent used in the radical polymerization method for manufacturing the methacrylic resin [2] can include alkyl mercaptans such as n-octylmercaptan, n-dodecylmercaptan, t-dodecylmercaptan, 1,4-butanedithiol, 1,6-hexanedithiol, ethyleneglycol bisthiopropionate, butanediol bisthioglycolate, butanediol bisthiopropionate, hexandiol bisthioglycolate, hexandiol bisthiopropionate, trimethylolpropane tris-(β-thiopropionate), pentaerythritol tetrakisthiopropionate and the like. Among these, monofunctional alkyl mercaptans such as n-octylmercaptan, n-dodecylmercaptan or the like are preferred. The chain transfer agents can be used alone or in combination of two or more.

The used amount of the chain transfer agent is preferably 0.1 to 1 part by mass, more preferably 0.15 to 0.8 part by mass, even more preferably 0.2 to 0.6 part by mass, most preferably 0.2 to 0.5 part by mass relative to 100 parts by mass of a monomer subjected to a polymerization reaction. Further, the used amount of the chain transfer agent is preferably 2500 to 10000 parts by mass, more preferably 3000 to 9000 parts by mass, even more preferably 3500 to 6000 parts by mass relative to 100 parts by mass of the polymerization initiator. In a case where the used amount of a chain transfer agent falls in the above ranges, the resulting methacrylic resin composition tends to have a good formability and a high mechanical strength.

There is no particular limitation for a solvent used in the radical polymerization method for manufacturing the methacrylic resin [2] as long as a monomer and the methacrylic resin [2] can be dissolved therein, but it is preferably aromatic hydrocarbons such as benzene, toluene, ethylbenzene or the like. The solvents can be used alone or in combination of two or more. The used amount of a solvent can be appropriately adjusted in view of the viscosity of a reaction liquid and productivity. For example, the used amount of a solvent is preferably not more than 100 parts by mass, more preferably not more than 90 mass % relative to 100 parts by mass of polymerization reaction raw materials.

The temperature during a polymerization reaction is preferably 100 to 200° C., more preferably 110 to 180° C. In a case where the polymerization temperature is not less than 100° C., the productivity tends to be improved, which is attributed to an improved polymerization rate, a reduced viscosity of a polymerization liquid and the like. Further, in a case where the polymerization temperature is not more than 200° C., a polymerization rate can easily be controlled, and the formation of by-products can be suppressed. Therefore, the coloring of the methacrylic resin composition according to the present invention can be suppressed. The duration of a polymerization reaction is preferably 0.5 to 4 hours, more preferably 1.5 to 3.5 hours, even more preferably 1.5 to 3 hours. Note that in the case of a continuous flow reactor, the duration of a polymerization reaction corresponds to the mean residence time in the reactor. In a case where the temperature during a polymerization reaction and the duration of the polymerization reaction fall in these ranges, the methacrylic resin [2] having an excellent transparency can be produced in high efficiency.

The polymerization conversion ratio in the radical polymerization method for manufacturing the methacrylic resin [2] is preferably 20 to 80 mass %, more preferably 30 to 70 mass %, even more preferably 35 to 65 mass %. In a case where the polymerization conversion ratio is not less than 20 mass %, remaining unreacted monomers can be easily removed, and a formed article comprising a methacrylic resin composition tends to have a good appearance. In a case where the polymerization conversion ratio is not more than 70 mass %, the viscosity of a polymerization liquid tends to be reduced, leading to improved productivity.

Although radical polymerization may be performed using a batch reactor system, it is preferably performed using a continuous flow reactor system in view of productivity. In the case of a continuous flow reaction, a polymerization reaction raw material (a mixture comprising a monomer, a polymerization initiator, a chain transfer agent and the like) are prepared, for example, under a nitrogen atmosphere. This is then fed to a reactor in a constant flow rate while the liquid in the reactor is withdrawn at a flow rate corresponding to the feeding rate. As a reactor, a tube reactor which can create near plug flow conditions and/or a tank reactor which can create near complete mixing conditions can be used. Further, polymerization may be performed in one reactor according to the continuous flow method, or may be performed in two or more reactors connected together according to the continuous flow method. In the present invention, at least one continuous flow tank reactor is preferably used. The liquid volume in a tank reactor at a polymerization reaction is preferably ¼ to ¾, more preferably ⅓ to ⅔ relative to the capacity of the tank reactor. The reactor is usually equipped with a stirrer. Examples of a stirrer can include a static stirrer, a dynamic stirrer. Examples of a dynamic stirrer can include a Max blend stirrer, a stirrer having lattice-shaped stirrers which rotate around a vertical rotation axis arranged at the center, a propeller stirrer, a screw stirrer and the like. Among these, a Max blend stirrer is preferably used in view of homogeneous mixing performance.

After the completion of polymerization, volatile matters such as unreacted monomers are removed, if needed. There is no particular limitation for a method of removal, but heating devolatilization is preferred. Examples of a devolatilization method can include the equilibrium flash mode, the adiabatic flash mode and the like. The devolatilization temperature in the adiabatic flash mode is preferably 200 to 280° C., more preferably 220 to 260° C. The duration of heating a resin in the adiabatic flash mode is preferably 0.3 to 5 minutes, more preferably 0.4 to 3 minutes, even more preferably 0.5 to 2 minutes. In a case where devolatilization is performed in these temperature ranges and these heating durations, the methacrylic resin [2] with less coloring can easily be obtained. Removed unreacted monomers can be recovered to recycle in the polymerization reaction. The yellow index of the recovered monomers may be increased due to the heat applied during recovery operations and the like. The recovered monomers are preferably refined by an appropriate method to reduce the yellow index.

The methacrylic resin composition according to the present invention has a mass ratio of the methacrylic resin [1]/the methacrylic resin [2] of from 40/60 to 70/30, preferably from 45/55 to 65/35, more preferably from 50/50 to 60/40. In a case where the mass ratio of the methacrylic resin [1]/the methacrylic resin [2] falls in the above ranges, a methacrylic resin composition can be obtained in which a good formability and a high glass transition temperature are simultaneously achieved.

The total amount of the methacrylic resin [1] and the methacrylic resin [2] comprised in the methacrylic resin composition according to the present invention is preferably not less than 80 mass %, more preferably not less than 85 mass %, even more preferably not less than 90 mass %, still more preferably not less than 95 mass %, most preferably not less than 98.5 mass %.

The kneaded product of only the methacrylic resin [1] and the methacrylic resin [2] has a lower limit of a triad syndiotacticity (rr) of 53%, preferably 55%, more preferably 58%, even more preferably 59%, most preferably 60%. In view of film formability, the above methacrylic resin has an upper limit of a triad syndiotacticity (rr) of preferably 99%, more preferably 85%, even more preferably 77%, still more preferably 65%, most preferably 64%. Note that the triad syndiotacticity (rr) of a kneaded product of only the methacrylic resin [1] and the methacrylic resin [2] can also be determined by measuring a methacrylic resin composition according to the method described above.

A kneaded product of only the methacrylic resin [1] and the methacrylic resin [2] has an Mw of preferably 50000 to 150000, more preferably 52000 to 120000, even more preferably 55000 to 100000. A kneaded product of only the methacrylic resin [1] and the methacrylic resin [2] has a molecular weight distribution of preferably 1.2 to 2.0, more preferably 1.3 to 1.7. In a case where the Mw and the molecular weight distribution fall in these ranges, the formability of a methacrylic resin composition will be good, and a formed article having an excellent impact resistance and toughness can easily be obtained.

A kneaded product of only the methacrylic resin [1] and the methacrylic resin [2] has a melt flow rate of preferably not less than 0.1 g/10 min, more preferably 0.2 to 30 g/10 min, even more preferably 0.5 to 20 g/10 min, most preferably 1.0 to 10 g/10 min, the melt flow rate being determined under the conditions of 230° C. and a load of 3.8 Kg.

Further, a kneaded product of only the methacrylic resin [1] and the methacrylic resin [2] has a glass transition temperature of preferably not less than 120° C., more preferably not less than 123° C., even more preferably not less than 124° C. There is no particular limitation for the upper limit of the glass transition temperature of a kneaded product of only the methacrylic resin [1] and the methacrylic resin [2], but it is preferably 130° C.

Examples of components other than the methacrylic resin [1] and the methacrylic resin [2] which can be comprised in the methacrylic resin composition according to the present invention can include, other polymers, and additives such as a filler, an antioxidant, a heat deterioration inhibitor, an ultraviolet absorber, a light stabilizer, a lubricant, a parting agent, a polymer processing aid, an antistatic agent, a flame retardant, dyes and pigments, a light diffusing agent, an organic dye, a delustering agent, an impact resistance modifier, a fluorescent substance. These may be added to either one or both of polymerization reaction liquids used when manufacturing the methacrylic resin [1] or the methacrylic resin [2], or may be added to either one or both of the methacrylic resin [1] and the methacrylic resin [2] manufactured by a polymerization reaction, or may be added to a kneaded product with the methacrylic resin [1] or the methacrylic resin [2].

Examples of other polymers can include polyolefin resins such as polyethylene, polypropylene, polybutene-1, poly-4-methylpentene-1, polynorbornene or the like; ethylene ionomers; styrene resins such as polystyrene, styrene-maleic anhydride copolymer, high impact polystyrene or the like, AS resins, ABS resins, AES resins, AAS resins, ACS resins, MBS resins; methyl methacrylate polymer, methyl methacrylate-styrene copolymer; polyester resins such as polyethylene terephthalate, polybutylene terephthalate or the like; polyamides such as Nylon 6, Nylon 66, polyamide elastomers or the like; polycarbonate, polyvinyl chloride, polyvinylidene chloride, polyvinyl alcohol, polyvinyl butyral, polyvinyl acetal, ethylene-vinyl alcohol copolymer, polyacetal, polyvinylidene fluoride, polyurethane, modified polyphenylene ether, polyphenylene sulfide, silicone modified resins; acrylic rubbers, acrylic thermoplastic elastomers, silicone rubbers; styrene thermoplastic elastomers such as SEPS, SEBS, SIS or the like; olefin rubbers such as IR, EPR, EPDM or the like. The amount of other polymers which may be comprised in the methacrylic resin composition according to the present invention is preferably not more than 10 mass %, more preferably not more than 5 mass %, most preferably 0 mass %.

The methacrylic resin composition according to a preferred embodiment of the present invention comprises the methacrylic resin [1], the methacrylic resin [2], and a polycarbonate resin or a polyester resin. In a case where a polycarbonate resin or a polyester resin is comprised, a methacrylic resin composition can be obtained in which the phase difference can easily be adjusted. The amount of a polycarbonate resin or a polyester resin is preferably 1 to 10 parts by mass, more preferably 2 to 7 parts by mass, even more preferably 3 to 6 parts by mass relative to the total 100 parts by mass of the methacrylic resin [1] and the methacrylic resin [2].

The methacrylic resin composition according to a more preferred embodiment of the present invention comprises the methacrylic resin [1], the methacrylic resin [2] and a polycarbonate resin. A polycarbonate resin used in the present invention is preferably an aromatic polycarbonate resin in view of compatibility. A polycarbonate resin is a polymer obtained by reacting a polyfunctional hydroxy compound with a carbonate-forming compound. The amount of a polycarbonate resin is preferably 1 to 10 parts by mass, more preferably 2 to 7 parts by mass, even more preferably 3 to 6 parts by mass relative to the total 100 parts by mass of the methacrylic resin [1] and the methacrylic resin [2] in view of that the phase difference of a formed article can easily be reduced.

An aromatic polycarbonate resin used in the present invention is not particularly limited by the manufacturing methods thereof. For example, the phosgene method (interfacial polymerization method), the melt polymerization method (transesterification method) and the like can be mentioned. Further, an aromatic polycarbonate resin preferably used in the present invention may be a polycarbonate resin manufactured by the melt polymerization method and then subjected to a post-treatment for adjusting the amount of terminal hydroxy groups.

Examples of a polyfunctional hydroxy compound which is a raw material for manufacturing a polycarbonate resin can include optionally substituted 4,4'-dihydroxybiphenyls; optionally substituted bis(hydroxyphenyl)alkanes; optionally substituted bis(4-hydroxyphenyl)ethers; optionally substituted bis(4-hydroxyphenyl)sulfides; optionally substituted bis(4-hydroxyphenyl)sulfoxides; optionally substituted bis(4-hydroxyphenyl)sulfones; optionally substituted bis(4-hydroxyphenyl)ketones; optionally substituted bis(hydroxyphenyl)fluorenes; optionally substituted dihydroxy-p-terphenyls; optionally substituted dihydroxy-p-quarterphenyls; optionally substituted bis(hydroxyphenyl)pyrazines; optionally substituted bis(hydroxyphenyl)menthanes; optionally substituted bis[2-(4-hydroxyphenyl)-2-propyl]benzens; optionally substituted dihydroxynaphthalenes; optionally substituted dihydroxybenzens; optionally substituted polysiloxanes; optionally substituted dihydroperfluoroalkanes; and the like.

Among these polyfunctional hydroxy compounds, preferred are 2,2-bis(4-hydroxyphenyl)propane, 1,1-bis(4-hydroxyphenyl)cyclohexane, bis(4-hydroxyphenyl)diphenylmethane, 1,1-bis(4-hydroxyphenyl)-1-phenylethane, 2,2-bis(4-hydroxy-3-methylphenyl)propane, 2,2-bis(4-hydroxy-3-phenylphenyl)propane, 4,4'-dihydroxybiphenyl, bis(4-hydroxyphenyl)sulfone, 2,2-bis(3,5-dibromo-4-hydroxyphenyl)propane, 3,3-bis(4-hydroxyphenyl)pentane, 9,9-bis(4-hydroxy-3-methylphenyl)fluorene, bis(4-hydroxyphenyl)ether, 4,4'-dihydroxybenzophenone, 2,2-bis(4-hydroxy-3-methoxypheny)1,1,1,3,3,3-hexafluoropropane, α,ω-bis[3-(2-hydroxyphenyl)propyl]polydimethylsiloxane, resorcin, or 2,7-dihydroxynaphthalene. In particular, 2,2-bis(4-hydroxyphenyl)propane is preferred.

Examples of a carbonate-forming compound can include various dihalogenated carbonyls such as phosgene or the like, haloformates such as chloroformate or the like, carbonate compounds such as bisaryl carbonate or the like. The amount of the carbonate-forming compound may be appropriately adjusted in consideration of the stoichiometry ratio (equivalence) of a reaction with a polyfunctional hydroxy compound.

A polymerization reaction is usually performed in a solvent in the presence of an acid binding agent. Examples of an acid binding agent can include alkali metal hydroxides such as sodium hydroxide, potassium hydroxide, lithium hydroxide, cesium hydroxide or the like; alkali metal carbonates such as sodium carbonate, potassium carbonate or the like; tertiary amines such as trimethylamine, triethylamine, tributylamine, N,N-dimethylcyclohexylamine, pyridine, dimethylaniline or the like; quaternary ammonium salts such as trimethylbenzylammonium chloride, triethylbenzylammonium chloride, tributylbenzylammonium chloride, trioctylmethylammonium chloride, tetrabutylammonium chloride, tetrabutylammonium bromide or the like; quaternary phosphonium salts such as tetrabuthylphosphonium chloride, tetrabuthylphosphonium bromide; and the like. Further, a small amount of an antioxidant such as sodium sulfite, hydrosulfide or the like may be added to this reaction system, if desired. The amount of an acid biding agent may be appropriately adjusted in consideration of the stoichiometry ratio (equivalence) of a reaction. Specifically, an acid binding agent may be used in 1 equivalence or excess, preferably 1 to 5 equivalences per mole of a hydroxyl group of a polyfunctional hydroxy compound as a raw material.

Further, a known chain-end terminator and branching agent can be used for the reaction. Examples of a chain-end terminator can include p-tert-butyl-phenol, p-phenylphenol, p-cumylphenol, p-perfluorononylphenol, p-(perfluorononylphenyl)phenol, p-(perfluoroxylphenyl)phenol, p-tert-perfluorobutylphenol, 1-(P-hydroxybenzyl)perfluorodecane, p-[2-(1H,1H-perfluorotridodecyloxy)-1,1,1,3,3,3-hexa fluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, 1,1,1,3,3,3-tetrafluoro-2-propanol; and the like.

Examples of a branching agent can include fluoroglycine, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl)methane, tetrakis[4-(4-hydroxyphenylisopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindole, 5-chloroisatin, 5,7-dichloroisatin, 5-bromoisatin and the like.

A polycarbonate resin may comprise a unit having a polyester, polyurethane, polyether or polysiloxane structure in addition to a polycarbonate unit.

In view of that phase difference can easily be controlled to a desired value and a film having an excellent transparency can be obtained, preferably used is a polycarbonate resin having an MVR value at 300° C. and 1.2 kg of preferably 1 to 100,000 $cm^3$/10 min, more preferably 80 to 400 $cm^3$/10 min, even more preferably 100 to 300 $cm^3$/10 min, still more preferably 130 to 250 $cm^3$/10 min, most preferably 150 to 230 $cm^3$/10 min, or a polycarbonate resin having a weight average molecular weight of preferably 5000 to 75000, more preferably 13000 to 32000, even more preferably 14000 to 30000, still more preferably 15000 to 28000, most preferably 18000 to 27000, the weight average molecular weight being obtained by converting a chromatogram measured by gel permeation chromatography (GPC) into the equivalent molecular weight of a polystyrene standard. The MVR value and the molecular weight of a polycarbonate resin can be controlled by adjusting the amount of a chain-end terminator and/or a branching agent.

Examples of a filler can include calcium carbonate, talc, carbon black, titanium oxide, silica, clay, barium sulfate, magnesium carbonate and the like. The amount of a filler which may be contained in the methacrylic resin composition according to the present invention is preferably not more than 3 mass %, more preferably not more than 1.5 mass %.

An antioxidant alone has an effect for preventing oxidation deterioration of a resin in the presence of oxygen. For example, a phosphorus antioxidizing agent, a hindered phenol antioxidizing agent, a thioether antioxidizing agent and the like can be mentioned. These antioxidants may be used alone or in combination of two or more. Among these, a phosphorus antioxidizing agent and a hindered phenol antioxidizing agent are preferred in view of the effect for preventing deterioration of an optical property due to coloring. More preferably, a phosphorus antioxidizing agent and a hindered phenol antioxidizing agent are used in combination.

In a case where a phosphorus antioxidizing agent and a hindered phenol antioxidizing agent are used in combination, the used amount of a phosphorus antioxidizing agent: the used amount of a hindered phenol antioxidizing agent is preferably 1:5 to 2:1, more preferably 1:2 to 1:1 in the mass ratio.

As a phosphorus antioxidizing agent, preferred are 2,2-methylenebis(4,6-di-t-butylphenyl)octylphosphite (ADEKA Corp.; product name: ADK STAB HP-10), tris(2,4-di-t-butylphenyl)phosphite (BASF A.G.; product name: IRGA-FOS168), 3,9-bis(2,6-di-tert-butyl-4-methylphenoxy)-2,4,8,10-tetraoxa-3,9-diphosphaspiro[5.5]undecane (ADEKA Corp: product name: ADK STAB PEP-36) and the like.

As a hindered phenol antioxidizing agent, preferred are pentaerythrityl-tetrakis[3-(3,5-di-t-butyl-4-hydroxy phenyl) propionate] (BASF A.G.; product name: IRGANOX1010), octadecyl-3-(3,5-di-t-butyl-4-hydroxyphenyl)propionate (BASF A.G.; product name: IRGANOX1076) and the like.

A thermal deterioration inhibitor can prevent thermal deterioration of a resin by capturing a polymer radical generated when exposed to high temperature essentially in the absence of oxygen.

As the thermal deterioration inhibitor, preferred are 2-t-butyl-6-(3'-t-butyl-5'-methyl-hydroxybenzyl)-4-m ethylphenylacrylate (Sumitomo Chemical Co., Ltd.; product name: Sumilizer GM), 2,4-di-t-amyl-6-(3',5'-di-t-amyl-2'-hydroxy-α-methyl benzyl)phenylacrylate (Sumitomo Chemical Co., Ltd.; product name: Sumilizer GS) and the like.

An ultraviolet absorber is a compound capable of absorbing ultraviolet light. An ultraviolet absorber is a compound which is said to have a function for mainly converting light energy into thermal energy.

Examples of an ultraviolet absorber can include benzophenones, benzotriazols, triazines, benzoates, salicylates, cyanoacrylates, oxalic anilides, malonic esters, formamidines and the like. These may be used alone or in combination of two or more. Among these, preferred are benzotriazols, triazines or an ultraviolet absorber in which the maximum molar extinction coefficient $\varepsilon_{max}$ in the wavelengths of 380 to 450 nm is not more than 1200 dm$^3$·mol$^-$1cm$^{-1}$.

Benzotriazols, which show a strong effect for preventing optical property deterioration such as coloring due to exposure to ultraviolet light, are preferred as an ultraviolet absorber when such a property is required for the methacrylic resin according to the present invention. As benzotriazols, preferred are 2-(2H-benzotriazol-2-yl)-4-(1,1,3,3-tetramethylbutyl) phenol (BASF A.G.; product name: TINUVIN329), 2-(2H-benzotriazol-2-yl)-4,6-bis(1-methyl-1-phenylethyl)phenol (BASF A.G.; product name TINUVIN234), 2,2'-methylenebis[6-(2H-benzotriazol-2-yl)-4-tert-octylphenol] (ADEKA Corp.; LA-31) and the like.

Further, an ultraviolet absorber in which the maximum molar extinction coefficient $\varepsilon_{max}$ in the wavelengths of 380 to 450 nm is not more than 1200 dm$^3$·mol$^{-1}$cm$^{-1}$ can suppress yellowish coloring of the resulting formed article. Examples of such an ultraviolet absorber can include 2-ethyl-2'-ethoxy-oxalanilide (Clariant Japan K.K.; product name: Sanduvor VSU) and the like.

Among these ultraviolet absorbers, benzotriazols are preferably used in view of that deterioration of a resin due to exposure to ultraviolet light can be suppressed.

Further, triazine ultraviolet absorbers are preferably used to efficiently absorb a light with a wavelength around a wavelength of 380 nm. Examples of such an ultraviolet absorber can include 2,4,6-tris(2-hydroxy-4-hexyloxy-3-methylphenyl)-1,3, 5-triazine (ADEKA Corp.; LA-F70), analogs thereof such as hydroxyphenyl triazine ultraviolet absorbers (BASF A.G.; TINUVIN477 or TINUVIN460) or the like.

Note that the maximum molar extinction coefficient $\varepsilon_{max}$ of an ultraviolet absorber is measured as follows. An ultraviolet absorber in an amount of 10.00 mg is added to 1 L of cyclohexane, and allowed to dissolve until no undissolved materials are visually observed. This solution is transferred into a 1 cm×1 cm×3 cm quartz glass cell, and the absorbance in the wavelengths of 380 to 450 nm is measured with a Hitachi U-3410 spectrophotometer. The maximum molar extinction coefficient $\varepsilon_{max}$ is computed by the following expression using the molecular weight ($M_{UV}$) of an ultraviolet absorber and the maximum value ($A_{max}$) of the measured absorbance.

$$\varepsilon_{max}=[A_{max}/(10\times 10^{-3})]\times M_{UV}$$

A light stabilizer is a compound which is said to have a function for capturing a radical mainly generated by light oxidation. Examples of a suitable light stabilizer can include hindered amines such as a compound having a 2,2,6,6-tetraalkylpiperidine backbone.

Examples of a lubricant can include stearic acid, behenic acid, stearoamide acid, methylenebisstearoamide, hydroxystearic acid triglyceride, paraffin wax, ketone wax, octyl alcohol, hardened oil and the like.

Examples of a parting agent can include higher alcohols such as cetyl alcohol, stearyl alcohol or the like; glycerin higher fatty acid esters such stearic acid monoglyceride, stearic acid diglyceride or the like; and the like. In the present invention, higher alcohols and glycerin fatty acid monoesters are preferably used in combination. In a case where higher alcohols and glycerin fatty acid monoesters are used in combination, there is no particular limitation for their ratio, but the used amount of higher alcohols:the used amount of glycerin fatty acid monoesters is preferably 2.5:1 to 3.5:1, more preferably 2.8:1 to 3.2:1 in the mass ratio.

As a polymer processing aid, used are polymer particles having a particle diameter of 0.05 to 0.5 μm which can be manufactured usually by the emulsion polymerization method. These polymer particles may be monolayer particles comprising a polymer of a single composition ratio and single limiting viscosity, or may be multilayer particles comprising two or more polymers having different composition ratios or limiting viscosities. Among these, two-layered particles having an inner polymer layer with a low limiting viscosity, and having an outer polymer layer with a high limiting viscosity of not less than 5 dl/g are preferably mentioned. A polymer processing aid preferably has a limiting viscosity of 3 to 6 dl/g. In a case where the limiting viscosity is too small, the effect for improving formability tends to be low. In a case where the limiting viscosity is too large, the formability of a methacrylic resin composition tends to be reduced. Specifically, the Metablen-P series from Mitsubishi Rayon Co., Ltd., products from Rohm & Hass Co., products from Dow Chemical Company, and the Paraloid series from Kureha Chemical Industry Co., Ltd. are mentioned. The amount of a polymer processing aid contained in the film or sheet according to the present invention is preferably not less than 0.1 part by mass and not more than 5 parts by mass relative to an acrylic resin. A loading amount of not more than 0.1 part by mass will not provide good processing properties while a loading amount of not less than 5 parts by mass will cause problems such as decreased surface properties.

Examples of an impact resistance modifier can include a core-shell modifier comprising a core layer comprising acrylic rubber or diene rubber; a modifier comprising two or more rubber particles; and the like.

As an organic dye, preferably used is a compound having a function for converting ultraviolet light into visible light.

Examples of a light diffusing agent and a delustering agent can include glass fine particles, polysiloxane crosslinked fine particles, cross-linked polymer fine particles, talc, calcium carbonate, barium sulfate and the like.

Examples of a fluorescent substance can include a fluorescent pigment, a fluorescent dye, a fluorescent white dye, a fluorescent whitening agent, a fluorescent bleaching agent and the like.

The total amount of an antioxidant, a heat deterioration inhibitor, an ultraviolet absorber, an infrared absorber, a light stabilizer, a lubricant, a parting agent, a polymer processing aid, an antistatic agent, a flame retardant, dyes and pigments, a light diffusing agent, an organic dye, a delustering agent, an impact resistance modifier and a fluorescent substance which can be comprised in the methacrylic resin composition according to the present invention is preferably not more than 7 mass %, more preferably not more than 5 mass %, even more preferably not more than 4 mass %.

The methacrylic resin composition according to the present invention is not particularly limited by the manufacturing methods thereof. For example, a methacrylic resin composition can be manufactured by melt-kneading the methacrylic resin [1], the methacrylic resin [2] and other polymers such as a polycarbonate resin. Melt-kneading can be performed using, for example, a melt-kneading machines such as a kneader ruder, an extruder, a mixing roll, a Banbury mixer or the like. The temperature at the time of kneading can be appropriately adjusted depending on the softening temperatures of the methacrylic resin [1], the methacrylic resin [2] and other polymers, but kneading is usually performed at a temperature within the range of 150° C. to 300° C. Further, a shear rate at the time of kneading can be adjusted within the range of 10 to 5000 sec$^{-1}$. Moreover, in a case where a methacrylic resin is melt-kneaded with a polycarbonate resin, melt-kneading is preferably performed under the conditions where the relative viscosity ($\eta_B/\eta_A$) of the melt viscosity ($\eta_A$) of the methacrylic resin [1], the methacrylic resin [2] or a resin composition thereof and the melt viscosity ($\eta_B$) of the polycarbonate resin is not more than 1.0.

As another method for manufacturing a methacrylic resin composition, mentioned is a method comprising polymerizing a monomer being a raw material of the methacrylic resin [2] in the presence of the methacrylic resin [1] and other polymers to obtain a methacrylic resin composition. Such a polymerization can be performed as the polymerization method for manufacturing the methacrylic resin [2]. In the case of the manufacturing method comprising polymerizing a monomer which is a raw material of the methacrylic resin [2] in the presence of the methacrylic resin [1] and other polymers, the heat history for the methacrylic resins is shorter than that in the case of the manufacturing method in which the methacrylic resin [1], the methacrylic resin [2] and other polymers are melt-kneaded. Therefore, the thermal decomposition of the methacrylic resins may be suppressed, and a formed article having less coloring and foreign substances can easily be obtained.

The methacrylic resin composition according to the present invention has a total content of a structural unit derived from methyl methacrylate of preferably not less than 90 mass %, more preferably not less than 95 mass %, even more preferably not less than 98 mass %, still more preferably not less than 99 mass %, and most preferably 100 mass % relative to the total amount of the methacrylic resin [1] and the methacrylic resin [2].

The Mw as determined by measuring the methacrylic resin composition according to the present invention by GPC is preferably 50000 to 150000, more preferably 52000 to 120000, even more preferably 55000 to 100000. The molecular weight distribution as determined by measuring the methacrylic resin composition according to the present invention by GPC is preferably 1.2 to 2.5, more preferably 1.3 to 2.0. In a case where the Mw and the molecular weight distribution fall in these ranges, the formability of a methacrylic resin composition is good, and a formed article having an excellent impact resistance and toughness can easily be obtained.

The melt flow rate as determined by measuring the methacrylic resin composition according to the present invention under the conditions of 230° C. and a load of 3.8 kg is preferably not less than 0.1 g/10 min, more preferably 0.2 to 30 g/10 min, even more preferably 0.5 to 20 g/10 min, most preferably 1.0 to 10 g/10 min.

Further, the glass transition temperature as determined by measuring the methacrylic resin composition according to the present invention is preferably not less than 120° C., more preferably not less than 123° C., even more preferably not less than 124° C. There is no particular limitation for the upper limit of the glass transition temperature of a methacrylic resin composition, but it is preferably 130° C.

The methacrylic resin composition according to the present invention can be formed into a pellet and the like in order to improve the convenience at the time of storage, transportation or forming.

The formed article according to the present invention comprises the methacrylic resin composition according to the present invention. There is no particular limitation for a method for manufacturing the formed article according to the present invention. For example, mentioned can be the melt-forming methods such as the T-die methods (the lamination method, the co-extruding method and the like), the inflation methods (the co-extrusion method and the like), the compression molding method, the blow molding method, the calendering forming method, the vacuum molding method, the injection molding methods (the insert molding method, the two-color method, the press method, the core back method, the sandwich method and the like); and the solution casting methods; and the like. Among these, The T-die method, the inflation method or the injection molding method is preferred in view of high productivity and low cost. There is no particular limitation for the type of a formed article, but a film (a planar formed article with a thickness of not less than 5 μm and not more than 250 μm) and a sheet (a planar formed article with a thickness of more than 250 μm) can be preferably mentioned. Among these, a film is particularly preferred.

A film or sheet as one embodiment of the formed article according to the present invention can be manufactured by the solution cast method, the melt casting method, the extrusion method, the inflation molding method, the blow molding method and the like. Among these, the extrusion method is preferred in view of that a film or sheet having an excellent transparency, an improved toughness, an excellent handling property and an excellent balance of toughness, surface hardness and stiffness can be obtained. The temperature of a methacrylic resin composition discharged from an extruder is set to preferably 160 to 270° C., more preferably 220 to 260° C.

Among the extrusion methods, in view of that a film or sheet with a good surface smoothness, a good specular gloss and a low haze can be obtained, preferred is a forming method, comprising extruding a methacrylic resin composition through a T-die in a molten state, and then sandwiching it between two or more mirrored rolls or mirrored belts.

Mirrored rolls or mirrored belts are preferably made of a metal. The linear pressure between a pair of mirrored rolls or mirrored belts is preferably not less than 10 N/mm, more preferably not less than 30 N/mm.

Further, the temperatures of the surfaces of mirrored rolls or mirrored belts are both preferably not more than 130° C. Moreover, the surface temperature of at least one in a pair of mirrored rolls or mirrored belts is preferably not less than 60° C. In a case where the surface temperature is set in this way, a methacrylic resin composition discharged from an extruder can be cooled at a rate faster than natural heat releasing, and therefore a film or sheet having an excellent surface smoothness and a low haze can easily be obtained. The thickness of an unstretched film or sheet obtained by extrusion is preferably 10 to 300 μm. The haze of the film is preferably not more than 0.5%, more preferably not more than 0.3% at a thickness of 100 μm.

Stretching treatment may be performed on a film or sheet formed of the methacrylic resin composition according to the present invention. Stretching treatment can enhance mechanical strength, and a film more resistant to cracking can be obtained. There is no particular limitation for the stretching methods, but they can include the simultaneous biaxial stretching method, the sequential biaxial stretching method, the tubular stretching method and the like. In view of that uniformly stretching can be performed and a film having a high strength can be obtained, the lower limit of a temperature at the time of stretching is a temperature of 10° C. above the glass transition temperature of a methacrylic resin composition, and the upper limit of a temperature at the time of stretching is a temperature of 40° C. above the glass transition temperature of the methacrylic resin composition. The stretching is usually performed at a rate of 100 to 5000%/min. A film with less thermal shrinkage can be obtained by performing heat setting after stretching. The thickness of a film after stretching is preferably 10 to 200 μm.

A functional layer may be provided on a surface of a film or sheet as one embodiment of the formed article according to the present invention. Examples of a functional layer can include a hard-coat layer, an anti-glare layer, an antireflective layer, an anti-sticking layer, a diffusion layer, a glare-proof layer, an antistatic layer, a antifouling layer, a slipping layer composed of fine particles, and the like.

An adhesive layer may be provided on a surface of a film or sheet as one embodiment of the formed article according to the present invention. As an adhesive in an adhesive layer, for example, an aqueous adhesive, a solvent adhesive, a hot melt adhesive, an active energy ray-curable adhesive and the like can be used. Among these, an aqueous adhesive and an active energy ray-curable adhesive are suitable.

Examples of an aqueous adhesive can include, but not particularly limited to, vinyl polymer adhesives, gelatin adhesives, vinyl latex adhesives, polyurethane adhesives, isocyanate adhesives, polyester adhesives, epoxy adhesives, and the like. To the aqueous adhesives, cross-linking agents and other additives, catalysts such as acid can also be blended, if desired. As the aqueous adhesives, an adhesive comprising a vinyl polymer is preferably used. As the vinyl polymer, a polyvinyl alcohol resin is preferred. Further, a water-soluble cross-linking agent such as boric acid, borax, glutaraldehyde, melamine, oxalic acid or the like may be contained in a polyvinyl alcohol resin. In particular, in a case where a polyvinyl alcohol polymer film is used as a polarizer, an adhesive comprising a polyvinyl alcohol resin is preferably used in view of adhesiveness. Further, an adhesive comprising a polyvinyl alcohol resin having an acetoacetyl group is more preferably used in view of improved durability. The aqueous adhesive is usually used as an adhesive in an aqueous solution state, and usually contains 0.5 to 60 wt % of solid contents.

For an active energy ray-curable adhesive, a compound having one or more (meth)acryloyl groups and a compound having a vinyl group can be used as a curable component, and other than that, a photocationic curable component mainly comprising an epoxy compound and/or an oxetane compound and a photo acid generating agent can also be used. As active energy ray, electron ray and ultraviolet light can be used.

The acrylic thermoplastic resin composition according to the present invention and a formed article comprising thereof can be used as a member for various uses. As specific uses, mentioned are, for example, signboard parts and marking films such as advertising pillars, stand signboards, side signboards, transom signboards, roof signboards and the like; display parts such as showcases, partition panels, store displays and the like; illumination parts such as fluorescent lamp covers, mood lighting covers, lamp shades, luminous ceilings, luminous walls, chandeliers and the like; interior parts such as furniture, pendants, mirrors and the like; architectural parts such as doors, domes, safety window glass, partitions, stair waiscot panels, balcony waiscot panels, leisure building roofs and the like; transportation related parts such as air plane windshields, pilot visors, motorcycle, motorboat windshields, bus sun visors, automobile side visors, rear visors, head wings, headlight covers, automobile interior members, automobile exterior members such as bumpers, and the like; electronic equipment parts such as faceplates for audiovisuals, stereo covers, television protective masks, vending machines, cellular phones, personal computers and the like; medical equipment parts such as incubators, roentgen parts and the like; instrument related parts such as machine covers, instrument covers, experiment devices, rulers, dials, observation windows and the like; optics related parts such as liquid crystal protective plates, light guide plates, light guide films, Fresnel's lens, lenticular lens, front panels of various displays, diffuser plates and the like; transportation related parts such as road signs, direction boards, mirrors on curved roads, sound insulating walls and the like; in addition, greenhouses, large-sized water tanks, box aquariums, bathroom members, clock panels, bath tubs, sanitary, desk mats, parts of recreational devices, toys, face protecting masks when welding, back sheets of solar cells, front sheets of flexible solar cells and the like; surface materials used in, for example, personal computers, cellular phones, furniture, vending machines, bathroom members; and the like.

As applications of materials having an excellent transparency and thermal resistance obtained by co-extruding the acrylic thermoplastic resin composition according to the present invention and a base material comprising a steel material, plastics, wood, glass and the like, they can also be suitably used in wallpaper; surfaces of automobile interior members; surfaces of automobile exterior members such as bumpers or the like; surfaces of cellular phones; furniture surfaces; surfaces of personal computers; surfaces of vending machines; surfaces of bathroom members such as bath tubs or the like.

A film or sheet as one embodiment of the formed article according to the present invention has a high transparency and a high thermal resistance. Therefore, they are suitable for optical use, and in particular suitable for use in a polarizer protective film, a liquid crystal protective plate, a surface material for portable information terminals, a display window protective film for portable information terminals, a light guide film, a transparent electric conductive film with silver nanowires and/or carbon nonotubes applied on a surface thereof, a front panel for various displays. In particular, the film or sheet according to the present invention comprising a methacrylic resin composition comprising methacrylic resins and a polycarbonate resin can provide desired phase difference, and thus is suitable for optical use in polarizer protective films, phase difference films and the like.

The film or sheet according to the present invention has a high transparency and a high thermal resistance. Therefore, it can be used for an IR cut films, a security film, a shatterproof film, a decoration film, a metal decoration film, a shrink film, a film for in-mold labels in addition to optical use.

In a case where a film or sheet as one embodiment of the formed article according to the present invention is used for a polarizer protective film or a phase difference film, only one side of the polarizer film may be laminated, or both sides may be laminated. When laminated on a polarizer film, lamination may be performed through an adhesive layer or an adherent layer. A stretched film having a film thickness of 1 μm to 100 μm, comprising a polyvinyl alcohol resin and iodine can be used for a polarizer film.

EXAMPLES

Below, the present invention will be described with reference to Examples and Comparative Examples. However, the present invention shall not be limited to the following Examples. Note that values for physical properties and the like were measured by the following methods.
(Polymerization Conversion Ratio)
An Inert Cap 1 (df=0.4 μm, 0.25 mm I.D.×60 m) from GL Sciences Inc. was connected as a column to a Shimadzu gas chromatography system GC-14A, and measurements were performed under the following conditions: the injection temperature was 180° C.; the detector temperature was 180° C.; the column temperature was increased from 60° C. (a holding time of 5 min.) to 200° C. at a rate of temperature increase of 10° C./min and then held for 10 min. The polymerization conversion ratio was computed based on these results.
(Mw, Molecular Weight Distribution)
The Mw and the molecular weight distribution were computed as a value in terms of the molecular weight of a polystyrene standard by determining a chromatogram by the gel permeation chromatography (GPC) under the following conditions:
GPC system: a TOSOH HLC-8320
Detector: a differential refractive index detector Columns: Two TOSOH TSKgel SuperMultipore HZM-M connected to a SuperHZ4000 in series were used.
Eluent: tetrahydrofuran
Eluent flow rate: 0.35 ml/min.
Column temperature: 40° C.
Calibration curve: created from 10 data points of 10 polystyrene standards.
(Triad Syndiotacticity (Rr))
$^1$H-NMR measurements were performed on a methacrylic resin or a methacrylic resin composition (in a case where a polycarbonate resin is contained, a methacrylic resin obtained by extraction thereof) obtained from each of Examples and Comparative Examples. In that spectrum when TMS is taken as 0 ppm, an area (X) of the 0.6 to 0.95 ppm region and an area (Y) of the 0.6 to 1.35 ppm region were measured, and a value computed using the formula: (X/Y)×100 was taken as the triad syndiotacticity (rr) (%).
Apparatus: a nuclear magnetic resonance system (Bruker ULTRA SHIELD 400 PLUS)
Solvent: deuterated chloroform
Nuclide to be measured: $^1$H
Measurement temperature: room temperature
Integration times: 64 times
(Glass Transition Temperature)
Using a differential scanning calorimeter (Shimadzu Corporation, DSC-50 (model number)), in accordance with JIS K7121, a methacrylic resin composition obtained from Example was heated to 230° C. and then cooled to room temperature. Subsequently, a DSC curve was measured under the conditions where heating was performed from room temperature to 230° C. at 10° C./min. The midpoint glass transition temperature obtained from the DSC curve measured during the second heating was taken as the glass transition temperature in the present invention.
(Melt Flow Rate (MFR))
Measurements were performed in accordance with JIS K7210 under the conditions of 230° C., a load of 3.8 kg and for 10 minutes.
(Bending Strength)
A methacrylic resin composition obtained from Example was injection molded at 230° C. to obtain a test piece (B) with 80 mm×10 mm×a thickness of 4.0 mm. In accordance with JIS K7171, three-point bending was performed on the test piece (B) at 23° C. using an autograph (Shimadzu Corporation), and the maximum point stress was taken as the bending strength.
(Variation in Thickness)
A methacrylic resin composition obtained from Example was dried at 80° C. for 12 hours. Using a 20-mm φ single screw extruder (from OCS), the methacrylic resin composition was extruded at a resin temperature of 260° C. through a T-die with a width of 150 mm, and directly fed into a cooling roll to obtain an unstretched film with a width of 100 nm and a thickness of 180 μm.
The minimum thickness $D_{min}$ [mm] and the maximum thickness $D_{max}$ [mm] of the unstretched film were measured, and then the variation in thickness as defined by the following expression was obtained.

Variation in thickness (%)=$\{(D_{max}-D_{min})/D_{min}\}\times 100$

The variation in thickness was evaluated according to the following criteria.
A: The variation in thickness is less than 5%.
B: The variation in thickness is 5% to 20%.
C: The variation in thickness is more than 20%.

(Surface Smoothness)

A surface of the above unstretched film was visually observed, and the surface smoothness was evaluated according to the following criteria.

A: The surface is smooth and good.
B: The surface is uneven.

(Haze)

In accordance with JIS K7136, the haze of the above unstretched film was measured with a haze meter (Murakami Color Research Laboratory Co., Ltd., HM-150).

(Heat Shrinkage Ratio)

The above unstretched film was cut out into 50 mm×40 mm, and placed in a tensile testing machine (Shimadzu AG-IS 5 kN) so that the distance between chucks was 40 mm, and stretched at a stretching temperature of 15° C. above the glass transition temperature, a stretching rate of 500%/min in one direction and a stretching ratio of two times in one direction. After maintained for 10 seconds, quenching was performed to obtain a stretched film with a thickness of 100 μm.

A straight line with a length of 70 mm was drawn on a surface of the stretched film obtained, and the stretched film was heated for 30 minutes in a forced air circulation thermostat oven maintained at a temperature of 110° C. Then the length (L (mm)) of the drawn straight line was read on a scale, and the heat shrinkage ratio was calculated using the following expression.

Heat shrinkage ratio (%)=(70−$L$)/70×100

(Total Light Transmittance)

A methacrylic resin composition obtained from Example was heat pressed at 230° C. to form a test piece (A) with 50 mm×50 mm×a thickness of 3.2 mm. In accordance with JIS K7361-1, the total light transmittance of the test piece (A) was measured with a haze meter (Murakami Color Research Laboratory Co., Ltd., HM-150).

(Yellow Index (YI))

Yellow index of the above test piece (A) was measured in a light path length of 3.2 mm with a colorimetric color difference meter (Nippon Denshoku Industries Co., Ltd, ZE-2000) in accordance with JIS Z8722.

YI was evaluated according to the following criteria.

A: YI is less than 5.
B: YI is not less than 5.

(Phase Difference (Rth) in the Direction of Film Thickness)

The above unstretched film was cut out into 50 mm×40 mm, and placed in a tensile testing machine (Shimadzu AG-IS 5 kN) so that the distance between chucks was 20 mm, and stretched at a stretching temperature of 20° C. above the glass transition temperature, a stretching rate of 500%/min in one direction and a stretching ratio of two times in one direction. After maintained for 10 seconds, quenching was performed to obtain a stretched film with a thickness of 100 μm.

A test piece of 40 mm×30 mm was cut out from the stretched film. Using an automatic birefringence meter (Oji Scientific Instruments, KOBRA-WR), three-dimensional refractive indexes, nx, ny, nz were obtained for this test piece from a phase difference value at a temperature of 23±2° C., a humidity of 50±5%, a wavelength of 590 nm and in the direction of 40° inclination to calculate a phase difference in the thickness direction Rth=((nx+ny)/2−nz)×d. The thickness d of the test piece was measured with a digimatic indicator (Mitutoyo Corporation), and the refractive index n was measured with a digital precision refractometer (Kalnew Optical Industrial Co., Ltd. KPR-20).

Manufacturing Example 1

A 5-L glass reactor equipped with a stirrer and a three-way stopcock was purged with nitrogen. Into this, thrown under room temperature were 1600 g of toluene, 3.19 g (13.9 mmol) of 1,1,4,7,10,10-hexamethyl triethylenetetramine, 68.6 g (39.6 mmol) of a 0.45 M toluene solution of isobutyl bis(2,6-di-t-butyl-4-methylphenoxy)aluminum and 7.91 g (13.2 mmol) of a 1.3 M solution (solvent: 95 mass % of cyclohexane and 5 mass % of n-hexane) of sec-butyl lithium. To this, 550 g of rectified methyl methacrylate was added dropwise at 20° C. with stirring over 30 minutes. After the completion of dropwise addition, it was stirred at 20° C. for 90 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [1-1] having an Mw of 58900, a molecular weight distribution of 1.06, a syndiotacticity (rr) of 74%, a glass transition temperature of 130° C. and the content of a structural unit derived from methyl methacrylate of 100 mass %.

Manufacturing Example 2

A 5-L glass reactor equipped with stirrers and a three-way stopcock was purged with nitrogen. Into this, thrown under room temperature were 1600 g of toluene, 2.49 g (10.8 mmol) of 1,1,4,7,10,10-hexamethyl triethylenetetramine, 53.5 g (30.9 mmol) of a 0.45 M toluene solution of isobutyl bis(2,6-di-t-butyl-4-methylphenoxy)aluminum and 6.17 g (10.3 mmol) of a 1.3 M solution (solvent: 95 mass % of cyclohexane and 5 mass % of n-hexane) of sec-butyl lithium. To this, 550 g of rectified methyl methacrylate was added dropwise at 20° C. with stirring over 30 minutes. After the completion of dropwise addition, it was stirred at 20° C. for 90 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [1-2] having an Mw of 81400, a molecular weight distribution of 1.08, a syndiotacticity (rr) of 73%, a glass transition temperature of 131° C. and the content of a structural unit derived from methyl methacrylate of 100 mass %.

Manufacturing Example 3

A 5-L glass reactor equipped with stirrers and a three-way stopcock was purged with nitrogen. Into this, thrown under room temperature were 1600 g of toluene, 2.49 g (10.8 mmol) of 1,1,4,7,10,10-hexamethyl triethylenetetramine, 53.5 g (30.9 mmol) of a 0.45 M toluene solution of isobutyl bis(2,6-di-t-butyl-4-methylphenoxy)aluminum and 6.17 g (10.3 mmol) of a 1.3 M solution (solvent: 95 mass % of cyclohexane and 5 mass % of n-hexane) of sec-butyl lithium. To this, 550 g of rectified methyl methacrylate was added dropwise at −20° C. with stirring over 30 minutes.

After the completion of dropwise addition, it was stirred at −20° C. for 180 minutes. The color of the solution changed from yellow to clear. The polymerization conversion ratio of methyl methacrylate was 100% at this time.

To the resulting solution, 1500 g of toluene was added for dilution. Subsequently, the above diluted solution was poured into 100 kg of methanol to obtain a precipitate. The precipitate obtained was dried at 80° C., 140 Pa for 24 hours to obtain a methacrylic resin [1-3] having an Mw of 96100, a molecular weight distribution of 1.07, a syndiotacticity (rr) of 83%, a glass transition temperature of 133° C. and the content of a structural unit derived from methyl methacrylate of 100 mass %.

Manufacturing Example 4

An autoclave having a stirrer and a sampling tube was purged with nitrogen. To this, added were 100 parts by mass of refined methyl methacrylate, 0.0052 part by mass of 2,2'-azobis(2-methylpropionitrile) (hydrogen abstraction ability: 1%, 1-hour half-life temperature: 83° C.) and 0.28 part by mass of n-octylmercaptan, and stirred to obtain a raw material liquid. Nitrogen was sent into this raw material liquid to remove oxygen dissolved in the raw material liquid.

The raw material liquid was transferred into a tank reactor connected to the autoclave through piping upto ⅔ of the capacity of the reactor. The temperature was maintained at 140° C., and a polymerization reaction was initiated by the batch method. Once the polymerization conversion ratio reached 55 mass %, the raw material liquid was fed into the tank reactor from the autoclave at a flow rate so that the mean residence time was 150 minutes while the reaction liquid was withdrawn from the tank reactor at a flow rate corresponding to the feeding flow rate of the raw material liquid, and maintained at a temperature of 140° C., and the mode of the polymerization reaction was switched to the continuous flow method. The steady-state polymerization conversion ratio was 55 mass % after switched.

The reaction liquid withdrawn from the tank reactor in the steady state was fed into a multitubular heat exchanger with an internal temperature of 230° C. for heating at a flow rate so that the mean residence time was 2 minutes. Subsequently, the heated reaction liquid was introduced into an adiabatic flash evaporator, and volatile matters mainly comprising unreacted monomers were removed to obtain a melt resin. The melt resin from which volatile matters had been removed was fed to a twin screw extruder with an internal temperature of 260° C., and discharged in a strand form, and cut with a pelletizer to obtain a pelletized methacrylic resin [2-1] having an Mw of 82000, a molecular weight distribution of 1.85, a syndiotacticity (rr) of 52%, a glass transition temperature of 120° C. and the content of a structural unit derived from methyl methacrylate of 100 mass %.

Manufacturing Example 5

The same operations were performed as in Manufacturing Example 4 except that the amount of n-octylmercaptan was changed to 0.30 part by mass to obtain a methacrylic resin [2-2] having an Mw of 76400, a molecular weight distribution of 1.81, a syndiotacticity (rr) of 53%, a glass transition temperature of 119° C. and the content of a structural unit derived from methyl methacrylate of 100 mass %.

Manufacturing Example 6

The same operations were performed as in Manufacturing Example 4 except that 100 parts by mass of methyl methacrylate was changed to 99 parts by mass of methyl methacrylate and 1 part by mass of methyl acrylate, and the amount of n-octylmercaptan was changed to 0.26 part by mass to obtain a methacrylic resin [2-3] having an Mw of 88900, a molecular weight distribution of 1.88, a syndiotacticity (rr) of 51%, a glass transition temperature of 118° C. and the content of a structural unit derived from methyl methacrylate of 99.3 mass %.

Manufacturing Example 7

The same operations were performed as in Manufacturing Example 4 except that the amount of 2,2'-azobis(2-methylpropionitrile) was changed to 0.0080 part by mass, and the amount of n-octylmercaptan was changed to 0.40 part by mass, and the temperature in the tank reactor was changed to 120° C., and the mean residence time in the tank reactor was changed to 120 minutes to obtain a methacrylic resin [2-4] having an Mw of 57800, a molecular weight distribution of 1.82, a syndiotacticity (rr) of 56%, a glass transition temperature of 122° C. and the content of a structural unit derived from methyl methacrylate of 100 mass %.

Manufacturing Example 8

The same operations were performed as in Manufacturing Example 4 except that the amount of n-octylmercaptan was changed to 0.42 part by mass to obtain a methacrylic resin [2-5] having an Mw of 55500, a molecular weight distribution of 1.76, a syndiotacticity (rr) of 50%, a glass transition temperature of 118° C. and the content of a structural unit derived from methyl methacrylate of 100 mass %.

Manufacturing Example 9

The same operations were performed as in Manufacturing Example 4 except that 100 parts by mass of methyl methacrylate was changed to 93.7 parts by mass of methyl methacrylate and 6.3 parts by mass of methyl acrylate, and the amount of 2,2'-azobis(2-methyl propionitrile) was changed to 0.0075 part by mass, and the amount of n-octylmercaptan was changed to 0.25 part by mass, and the temperature in the tank reactor was changed to 180° C., and the mean residence time in the tank reactor was changed to 60 minutes to obtain a methacrylic resin [2-6] having an Mw of 84300, a molecular weight distribution of 2.18, a syndiotacticity (rr) of 47%, a glass transition temperature of 115° C. and the content of a structural unit derived from methyl methacrylate of 95 mass %.

Manufacturing Example 10

The same operations were performed as in Manufacturing Example 4 except that the amount of 2,2'-azobis(2-methylpropionitrile) was changed to 0.32 part by mass, and the amount of n-octylmercaptan was changed to 0.32 part by mass, and the temperature in the tank reactor was changed to 60° C., and the mean residence time in the tank reactor was changed to 300 minutes to obtain a methacrylic resin [3-1] having an Mw of 78600, a molecular weight distribution of 1.79, a syndiotacticity (rr) of 64%, a glass transition temperature of 124° C. and the content of a structural unit derived from methyl methacrylate of 100 mass %.

Manufacturing Example 11

The same operations were performed as in Manufacturing Example 4 except that the amount of n-octylmercaptan was changed to 0.225 part by mass to obtain a methacrylic resin [2-7] having an Mw of 103600, a molecular weight distribution of 1.81, a syndiotacticity (rr) of 52%, a glass transition temperature of 120° C. and the content of a structural unit derived from methyl methacrylate of 100 mass %.

Example 1

The methacrylic resin [1-1] in 50 parts by mass was mixed with 50 parts by mass of the methacrylic resin [2-1], and melt-kneaded at 230° C. for 3 minutes with a Labo Plastomill (Toyo Seiki Kogyo Co., Ltd.) to manufacture a methacrylic resin composition [1]. Evaluation results of the methacrylic resin composition [1] are shown in Table 1. In the table, the MMA unit content means a proportion of a structural unit derived from methyl methacrylate.

Example 2

The methacrylic resin [1-1] in 50 parts by mass, the methacrylic resin [2-1] in 50 parts by mass and a processing aid (Paraloid K125-P; Kureha Chemical Industry Co., Ltd.) in 1 part by mass were mixed, and melt-kneaded at 230° C. for 3 minutes using a Labo Plastomill (Toyo Seiki Kogyo Co., Ltd.) to manufacture a methacrylic resin composition [2]. Evaluation results of the methacrylic resin composition [2] are shown in Table 1.

Example 3

The methacrylic resin [1-1] in 50 parts by mass, the methacrylic resin [2-1] in 50 parts by mass and an ultraviolet absorber (ADK STAB LA-31; ADEKA Corp.) in 1 part by mass were mixed, and melt-kneaded at 230° C. for 3 minutes using a Labo Plastomill (Toyo Seiki Kogyo Co., Ltd.) to manufacture a methacrylic resin composition [3]. Evaluation results of the methacrylic resin composition [3] are shown in Table 1.

TABLE 1

|  | Examples | | | | | |
| --- | --- | --- | --- | --- | --- | --- |
|  | 1 | 2 | 3 | 4 | 5 | 6 |
| Methacrylic resin[1-1] [parts by mass] | 50 | 50 | 50 | 70 | 40 | 50 |
| Methacrylic resin[2-1] [parts by mass] | 50 | 50 | 50 | 30 | | |
| Methacrylic resin[2-2] [parts by mass] | | | | | 60 | 50 |
| Processing aid [part by mass] | | 1 | | | | |
| UV absorber [part by mass] | | | 1 | | | |
| Methacrylic resin composition | (1) | (2) | (3) | (4) | (5) | (6) |
| MMA unit content [mass %] | 100 | 100 | 100 | 100 | 100 | 100 |
| Weight average molecular weight(Mw) | 72,200 | 77,500 | 72,200 | 68,200 | 71,500 | 68,600 |
| Molecular weight distribution | 1.43 | 1.54 | 1.43 | 1.27 | 1.58 | 1.40 |
| Triad syndiotacticity(rr) [%] | 61.8 | 61.8 | 61.8 | 66.7 | 61.0 | 62.0 |
| Glass transition temperature [° C.] | 125 | 125 | 125 | 127 | 124 | 125 |
| MFR(230° C. 3.8 Kg) [g/10 min] | 2.6 | 2.6 | 2.6 | 2.4 | 2.9 | 2.6 |
| Bending strength [MPa] | 102 | 105 | 102 | 104 | 97 | 99 |
| Variation in thickness | A | A | A | B | A | A |
| Surface smoothness | A | A | A | A | A | A |
| Heat shrinkage ratio [%] | 5.7 | 6.0 | 5.7 | 4.2 | 8.1 | 7.1 |
| Haze [%] | 0.1 | 0.1 | 0.1 | 0.1 | 0.1 | 0.1 |
| Total light transmittance [%] | 92 | 92 | 92 | 92 | 92 | 92 |
| Yellow index (YI) | A | A | A | A | A | A |

Examples 4 to 12

Methacrylic resin compositions [4] to [12] were manufactured by the same method as in Example 1 except that the recipes as shown in Tables 1 and 2 were used. Evaluation results for the methacrylic resin compositions [4] to [12] are shown in Tables 1 and 2.

TABLE 2

|  | Examples | | | | | |
| --- | --- | --- | --- | --- | --- | --- |
|  | 7 | 8 | 9 | 10 | 11 | 12 |
| Methacrylic resin[1-1] [parts by mass] | 60 | 60 | | | | |
| Methacrylic resin[1-2] [parts by mass] | | | 50 | 50 | 50 | |
| Methacrylic resin[1-3] [parts by mass] | | | | | | 40 |
| Methacrylic resin[2-2] [parts by mass] | 40 | | | | | |
| Methacrylic resin[2-3] [parts by mass] | | 40 | | | | |
| Methacrylic resin[2-4] [parts by mass] | | | 50 | | | |
| Methacrylic resin[2-5] [parts by mass] | | | | 50 | | 60 |
| Methacrylic resin[2-6] [parts by mass] | | | | | 50 | |
| Methacrylic resin composition | (7) | (8) | (9) | (10) | (11) | (12) |
| MMA unit content [mass %] | 100 | 99.7 | 100 | 100 | 97.5 | 100 |
| Weight average molecular weight(Mw) | 72,600 | 73,800 | 69,600 | 68,400 | 82,900 | 71,700 |
| Molecular weight distribution | 1.44 | 1.36 | 1.56 | 1.53 | 1.62 | 1.68 |
| Triad syndiotacticity(rr) [%] | 62.0 | 61.0 | 62.0 | 62.0 | 60.0 | 63.0 |
| Glass transition temperature [° C.] | 126 | 126 | 124 | 124 | 123 | 124 |
| MFR(230° C. 3.8 Kg) [g/10 min] | 2.7 | 2.2 | 4.0 | 2.4 | 2.7 | 3.4 |
| Bending strength [MPa] | 102 | 106 | 93 | 95 | 114 | 104 |
| Variation in thickness | A | A | A | A | A | A |
| Surface smoothness | A | A | A | A | A | A |

TABLE 2-continued

| | Examples | | | | | |
|---|---|---|---|---|---|---|
| | 7 | 8 | 9 | 10 | 11 | 12 |
| Heat shrinkage ratio [%] | 5.9 | 5.5 | 5.8 | 7.6 | 8.0 | 6.3 |
| Haze [%] | 0.1 | 0.1 | 0.1 | 0.1 | 0.1 | 0.1 |
| Total light transmittance [%] | 92 | 92 | 92 | 92 | 92 | 92 |
| Yellow index (YI) | A | A | A | A | A | A |

Comparative Example 1

The methacrylic resin [2-2] was melt-kneaded at 230° C. for 3 minutes using a Labo Plastomill (Toyo Seiki Kogyo Co., Ltd.), and then evaluated in the same manner as in Example 1. Evaluation results are shown in Table 3.

TABLE 3

| | Comp. Examples | | | | | |
|---|---|---|---|---|---|---|
| | 1 | 2 | 3 | 4 | 5 | 6 |
| Methacrylic resin[1-1] [parts by mass] | | | 100 | | 30 | 50 |
| Methacrylic resin[1-2] [parts by mass] | | | | 100 | | |
| Methacrylic resin[2-1] [parts by mass] | | | | | 70 | |
| Methacrylic resin[2-2] [parts by mass] | 100 | | | | | |
| Methacrylic resin[2-5] [parts by mass] | | 100 | | | | |
| Methacrylic resin[3-1] [parts by mass] | | | | | | 50 |
| Methacrylic resin composition | (2-2) | (2-5) | (1-1) | (1-2) | (13) | (14) |
| MMA unit content [mass %] | 100 | 100 | 100 | 100 | 100 | 100 |
| Weight average molecular weight(Mw) | 76,400 | 55,500 | 58,900 | 81,400 | 76,800 | 78,500 |
| Molecular weight distribution | 1.81 | 1.76 | 1.06 | 1.08 | 1.62 | 1.51 |
| Triad syndiotacticity(rr) [%] | 53.0 | 50.0 | 74.0 | 73.0 | 58.2 | 70.0 |
| Glass transition temperature [° C.] | 119 | 118 | 130 | 131 | 123 | 127 |
| MFR(230° C. 3.8 Kg) [g/10 min] | 3.6 | 10 | 2.1 | 0.9 | 2.7 | 1.5 |
| Bending strength [MPa] | 90 | 60 | 105 | 120 | 98 | 103 |
| Variation in thickness | A | A | C | C | A | C |
| Surface smoothness | A | A | B | B | A | B |
| Heat shrinkage ratio [%] | 19 | 22 | 3.1 | 2.7 | 12 | 4.7 |
| Haze [%] | 0.1 | 0.1 | 0.5 | 0.8 | 0.1 | 0.2 |
| Total light transmittance [%] | 92 | 92 | 91 | 91 | 92 | 92 |
| Yellow index (YI) | A | A | B | B | A | A |

Comparative Example 2

Melt kneading was performed by the same method as in Comparative Example 1 except that the methacrylic resin [2-5] was used instead of the methacrylic resin [2-2], and then evaluation was performed in the same manner as in Example 1. Evaluation results are shown in Table 3.

Comparative Example 3

Melt kneading was performed by the same method as in Comparative Example 1 except that the methacrylic resin [1-1] was used instead of the methacrylic resin [2-2], and then evaluation was performed in the same manner as in Example 1. Evaluation results are shown in Table 3.

Comparative Example 4

Melt kneading was performed by the same method as in Comparative Example 1 except that the methacrylic resin [1-2] was used instead of the methacrylic resin [2-2], and then evaluation was performed in the same manner as in Example 1. Evaluation results are shown in Table 3.

Comparative Examples 5 to 6

Methacrylic resin compositions [13] and [14] were manufactured according to the recipes shown in Table 3 by the same method as in Example 1, and then evaluation was performed in the same manner as in Example 1. Evaluation results are shown in Table 3.

The above results indicate that a methacrylic resin composition comprising the methacrylic resin [1] having a triad syndiotacticity (rr) of not less than 65% and the methacrylic resin [2] having a triad syndiotacticity (rr) of 45 to 58% in a mass ratio (the methacrylic resin [1]/the methacrylic resin [2]) of 40/60 to 70/30 can provide a formed article having a high transparency, a low thermal shrinkage, a high strength and an excellent surface smoothness.

Examples 13 to 21

Methacrylic resin compositions [15] to [23] were manufactured according to the recipes shown in Table 4 or 5 by the same method as in Example 1, and then evaluation was performed in the same manner as in Example 1. Evaluation results are shown in Table 4 or 2. Note that the polycarbonate resins used in this Examples are the following 5 types.

PC1: Available from Mitsubishi Engineering Plastics Corporation, IupilonHL-8000 (model number), MVR (300° C., 1.2 kg)=136 cm$^3$/10 min.

PC2: Available from Sumika Styron Polycarbonate Limited, SD POLYCA TR-2001 (model number), MVR (300° C., 1.2 kg)=200 cm$^3$/10 min.

PC3: Available from Sumika Styron Polycarbonate Limited, Calibre 301-40 (model number), MVR (300° C., 1.2 kg)=40 cm$^3$/10 min PC4: Available from Mitsubishi Engineering Plastics Corporation, AL071; MVR (300° C., 1.2 kg)=not less than 1000 cm$^3$/10 min. (accurate measurements were difficult due to high fluidity), Mv=5500.

PC5: a resin in which 50 parts by mass of PC2 was mixed with 50 parts by mass of PC4; MVR (300° C., 1.2 kg)=not less than 1000 cm³/10 min (accurate measurements were difficult due to high fluidity), Mv=8500.

Comparative Example 7

The methacrylic resin [2-7] was melt-kneaded at 230° C. for 3 minutes using a Labo Plastomill (Toyo Seiki Kogyo Co., Ltd.), and then evaluation was performed in the same manner as in Example 1. Evaluation results are shown in Table 4.

Comparative Example 4

The biaxially stretched film obtained from Comparative Example 4 described above was further evaluated for the phase difference (Rth) in the direction of film thickness. Evaluation results are shown in Table 4.

TABLE 4

|  | Ex. | | | | Comp. Ex. | |
| --- | --- | --- | --- | --- | --- | --- |
|  | 13 | 14 | 15 | 16 | 4 | 7 |
| Methacrylic resin[1-2] [parts by mass] | 57 | 57 | 57 | 57 | 100 |  |
| Methacrylic resin[2-7] [parts by mass] | 43 | 43 | 43 | 43 |  | 100 |
| Polycarbonate resin[PC1] [parts by mass] |  | 2 | 4 | 6 |  |  |
| Methacrylic resin composition | (15) | (16) | (17) | (18) | (1-2) | (2-7) |
| MMA unit content [mass %] | 100 | 100 | 100 | 100 | 100 | 100 |
| Weight average molecular weight(Mw) | 88,600 | 84,000 | 77,300 | 75,200 | 81,400 | 103,600 |
| Molecular weight distribution | 1.32 | 1.48 | 1.60 | 1.62 | 1.08 | 1.81 |
| Triad syndiotacticity(rr) [%] | 62 | 62 | 62 | 62 | 73 | 52 |
| Glass transition temperature [° C.] | 126 | 126 | 126 | 126 | 131 | 120 |
| MFR(230° C. 3.8 Kg) [g/10 min] | 1.3 | 1.3 | 1.4 | 1.5 | 0.9 | 1.4 |
| Bending strength [MPa] | 122 | 120 | 121 | 110 | 120 | 115 |
| Variation in thickness | A | A | A | A | C | A |
| Surface smoothness | A | A | A | A | B | A |
| Heat shrinkage ratio [%] | 5.6 | 5.6 | 5.3 | 5.1 | 2.7 | 15 |
| Haze [%] | 0.1 | 0.2 | 0.3 | 0.5 | 0.8 | 0.1 |
| Total light transmittance [%] | 92 | 92 | 92 | 92 | 91 | 92 |
| Yellow index (YI) | A | A | A | A | B | A |
| Phase difference in film thickness direction (Rth) [nm] | −19 | −12 | −1.3 | 16 | −23 | −14 |

*The MMA unit content is a value based on the total amount of methacrylic resin.

TABLE 5

|  | Examples | | | | |
| --- | --- | --- | --- | --- | --- |
|  | 17 | 18 | 19 | 20 | 21 |
| Methacrylic resin[1-2] [parts by mass] | 57 | 57 | 57 | 57 | 57 |
| Methacrylic resin[2-7] [parts by mass] | 43 | 43 | 43 | 43 | 43 |
| Polycarbonate resin[PC2] [parts by mass] | 4 | 2.8 |  |  |  |
| Polycarbonate resin[PC3] [parts by mass] |  |  | 2.5 |  |  |
| Polycarbonate resin[PC4] [parts by mass] |  |  |  | 5 |  |
| Polycarbonate resin[PC5] [parts by mass] |  |  |  |  | 3.5 |
| Processing aid [parts by mass] | 2 | 2 | 2 | 2 | 2 |
| Methacrylic resin composition | (19) | (20) | (21) | (22) | (23) |
| MMA unit content [mass %] | 100 | 100 | 100 | 100 | 100 |
| Weight average molecular weight(Mw) | 90,000 | 95,000 | 96,200 | 91,500 | 98,000 |
| Molecular weight distribution | 1.89 | 1.80 | 1.78 | 2.55 | 2.08 |
| Triad syndiotacticity(rr) [%] | 62 | 62 | 62 | 62 | 62 |
| Glass transition temperature [° C.] | 126 | 126 | 126 | 123 | 124 |
| MFR(230° C. 3.8 Kg) [g/10 min] | 1.4 | 1.3 | 1.3 | 1.8 | 1.5 |
| Bending strength [MPa] | 118 | 120 | 120 | 114 | 121 |
| Variation in thickness | A | A | A | A | A |
| Surface smoothness | A | A | A | A | A |
| Heat shrinkage ratio [%] | 5.2 | 5.0 | 5 | 9.2 | 7.5 |
| Haze [%] | 0.3 | 0.2 | 0.3 | 0.2 | 0.2 |
| Total light transmittance [%] | 92 | 92 | 92 | 92 | 92 |
| Yellow index (YI) | A | A | A | A | A |
| Phase difference in film thickness direction (Rth) [nm] | 2.0 | −0.4 | −0.5 | 0.1 | −0.2 |

*The MMA unit content is a value based on the total amount of methacrylic resin.

The above results indicate that the phase difference in the film thickness direction can be adjusted by blending a polycarbonate resin with a methacrylic resin composition comprising the methacrylic resin [1] having a triad syndiotacticity (rr) of not less than 65% and the methacrylic resin [2] having a triad syndiotacticity (rr) of 45 to 58% in a mass ratio (the methacrylic resin [1]/the methacrylic resin [2]) of 40/60 to 70/30.

The invention claimed is:

1. A methacrylic resin composition comprising:
    a methacrylic resin [1] having a triad syndiotacticity (rr) of not less than 65% and
    a methacrylic resin [2] having a triad syndiotacticity (rr) of 45 to 58%, in a mass ratio of the methacrylic resin [1]/the methacrylic resin [2] of 40/60 to 70/30,
    wherein a molecular weight distribution (Mw/Mn) of the methacrylic resin [1] is 1.01 to 1.8, and a molecular weight distribution (Mw/Mn) of the methacrylic resin [2] is 1.7 to 2.6.

2. The methacrylic resin composition according to claim 1, wherein the total content of a structural unit derived from methyl methacrylate is not less than 99 mass % relative to the total mass of the methacrylic resin [1] and the methacrylic resin [2].

3. The methacrylic resin composition according to claim 1, wherein the weight average molecular weight of the methacrylic resin [2] is 50000 to 150000.

4. The methacrylic resin composition according to claim 1, further comprising an ultraviolet absorber.

5. The methacrylic resin composition according to claim 1, further comprising 1 to 10 parts by mass of a polycarbonate resin relative to the total 100 parts by mass of the methacrylic resin [1] and the methacrylic resin [2].

6. A method for manufacturing a methacrylic resin composition, the method comprising:
    melt-kneading a methacrylic resin [1] having a triad syndiotacticity (rr) of not less than 65% and a methacrylic resin [2] having a triad syndiotacticity (rr) of 45 to 58%, in a mass ratio of the methacrylic resin [1]/the methacrylic resin [2] of 40/60 to 70/30,
    wherein a molecular weight distribution (Mw/Mn) of the methacrylic resin [1] is 1.01 to 1.8, and a molecular weight distribution (Mw/Mn) of the methacrylic resin [2] is 1.7 to 2.6.

7. The method according to claim 6, further comprising melt-kneading a polycarbonate resin.

8. The method according to claim 7, wherein an amount of the polycarbonate resin is 1 to 10 parts by mass relative to the total 100 parts by mass of the methacrylic resin [1] and the methacrylic resin [2].

9. The method according to claim 6, further comprising anionic polymerization for producing the methacrylic resin [1].

10. The method according to claim 6, further comprising radical polymerization at a polymerization temperature of 100 to 200° C. for producing the methacrylic resin [2].

* * * * *